United States Patent [19]

Kim et al.

[11] Patent Number: 5,276,107
[45] Date of Patent: Jan. 4, 1994

[54] POLYMER COMPOSITION FOR FORMING IN-SITU COMPOSITE MOLDED ARTICLES

[75] Inventors: Kwang U. Kim; Byoung C. Kim; Soon M. Hong, all of Seoul, Rep. of Korea

[73] Assignee: Korea Institute of Science and Technology, Seoul, Rep. of Korea

[21] Appl. No.: 891,210

[22] Filed: Jun. 1, 1992

[30] Foreign Application Priority Data

Aug. 7, 1991 [KR] Rep. of Korea ............. 91-13644

[51] Int. Cl.$^5$ .................. C08L 77/06; C08F 20/00
[52] U.S. Cl. .................... 525/436; 525/425; 525/437; 525/439; 525/450; 525/535; 525/537
[58] Field of Search ............ 525/437, 425, 439, 436, 525/450

[56] References Cited

U.S. PATENT DOCUMENTS

| | | | |
|---|---|---|---|
| 4,021,596 | 5/1977 | Bailey | 525/537 |
| 4,083,829 | 4/1978 | Calundann et al. | 528/176 |
| 4,184,996 | 1/1980 | Calundann | 528/190 |
| 4,202,951 | 5/1980 | Wang et al. | 525/416 |
| 4,238,599 | 12/1980 | Langley et al. | 528/194 |
| 4,272,625 | 6/1981 | McIntyre et al. | 528/183 |
| 4,276,397 | 6/1981 | Froix | 525/448 |
| 4,710,546 | 12/1987 | Reichert et al. | 525/420 |
| 4,798,849 | 1/1989 | Thomas et al. | 521/128 |
| 4,963,402 | 10/1990 | Wong | 525/51 |

FOREIGN PATENT DOCUMENTS 0103279 3/1984 European Pat. Off. .

OTHER PUBLICATIONS

Polymer Engineering and Science, vol. 27, No. 6, pp. 410–423 (1987) "In Situ Composites: Blends of Isotropic Polymers and Thermotropic Liquid Crystalline Polymers" Garbor Kiss.

Polymer Composites, vol. 8, No. 3, pp. 158–175 (1987), "Self-Reinforced Melt Processible Polymer Composites: Extrusion, Compression and Injection Molding" A. I. Isayev and M. Modic.

Polymer Engineering and Science, vol. 29, No. 9, pp. 600–607 (1989) "Characterization of Liquid Crystalline Polyester Polycarbonate Blends" Tariq M. Malik, Pierre J. Carreau and Nathalie Chapleau.

Polymer Engineering and Science, vol. 29, No. 9, pp. 573–580 (1989), "The Effect of Deformation History on the Morphology and Properties of Blends of Polycarbonate and a Thermotropic Liquid Crystalline Polymer" A. Kohli, N. Chung and R. A. Weiss.

Plastics Molding Techniques, vol. 4, No. 11, pp. 89–94, "Polymer Blend of Liquid Crystalline Polymers".

*Primary Examiner*—John C. Bleutge
*Assistant Examiner*—Helen F. Lee
*Attorney, Agent, or Firm*—Oblon, Spivak, McClelland, Maier & Neustadt

[57] ABSTRACT

A polymer composition for forming in-situ composite molded articles is provided. The polymer composition comprises a polyphenylene sulfide matrix resin, a thermotropic liquid crystal polymer, and a non-crystalline polymer. The polymer composition may be melt injected or melt extruded to form in-situ composite molded articles having improved mechanical properties.

5 Claims, No Drawings

POLYMER COMPOSITION FOR FORMING IN-SITU COMPOSITE MOLDED ARTICLES

BACKGROUND OF THE INVENTION

1. Field of the Invention

The present invention relates to a polymer composition for forming in-situ composite molded articles having improved mechanical properties. More particularly, the present invention relates to a polymer composition for forming in-situ composite molded articles which comprises a polyphenylene sulfide matrix resin, a thermotropic liquid crystal polymer and a non-crystalline polymer.

2. Description of the Prior Art

Hitherto, general purpose plastics and engineering plastics have been reinforced with various kinds of inorganic additives in order to improve their mechanical strength and thermal properties. However, the use of such inorganic reinforcing agents causes some problems to the subsequent processing steps, for example, an excessive increase in the melt viscosity of the resulting polymer compositions, the abrasion of the processing machinery, and the like.

As an attempt to resolve the above problems, the so-called "in-situ composite forming technique" has been proposed, according to which technique, to an isotropic plastics such as general purpose plastics or engineering plastics as a matrix resin, an anisotropic, thermotropic liquid crystal polymer as a reinforcing agent is added. In this prior art technique, the thermotropic liquid crystal polymer reinforcing agent is present as a low viscous melt at the first stage, but it is crystallized upon cooling to form needle-like reinforced structures in the molding step. The technique of this type using the in-situ crystallization is advantageous since both the processability and the mechanical properties can be simultaneously improved.

A number of in-situ composite forming techniques are described in the prior patents and literatures. See "*Polymer Engineering and Science,*" Vol. 27, p. 410; Vol. 29, pp. 9 and 600; and "*Polymer Composite,*" Vol. 8, p. 158. In this prior art technique, non-crystalline engineering plastics are reinforced with thermotropic liquid crystal polymers. However, the resultant in-situ composite molded articles are still unsatisfactory in terms of their mechanical properties, heat-resistance, dimensional stability, etc..

In order to remove these defects, it has been suggested to use, as the matrix resin crystalline engineering plastics, for example, polybutylene terephthalate (PBT), nylon, and polyphenylene sulfide (PPS) in place of the non-crystalline plastics. For example, U.S. Pat. No. 4,202,951 discloses a moldable blended composition comprising polyphenylene sulfide in admixture with branched polyphenylenes. The blend exhibits superior mechanical properties after heat aging to either component alone. U.S. Pat. No. 4,710,546 discloses a polyphenylene sulfide reinforced with chemically activated fibres or fillers. This reinforced polyphenylene sulfide is useful as an embedding composition. European Patent No. 0 103 279 discloses a poly(arylene sulfide) having a lower melt crystallization temperature. The molded objects obtained from such arylene sulfide polymers exhibit improved physical properties.

However, in order to obtain successful results from the prior art techniques mentioned above, the two or more crystalline polymers to be blended must be properly selected taking into account the physical properties thereof. Generally, when a crystalline polymer is blended with other crystalline polymer, if the two polymers fail to form co-crystallized structures, then the resulting blend tends to give rise to phase separation in the crystallization step thereof, resulting in poor mechanical properties. In practice, this tendency becomes serious when the crystallization temperature, crystallization rate and thermal expansion coefficient of the two polymers are different from each other or when the interface adhesiveness between the two polymers is poor. From this point of view, the thermotropic liquid crystal polymers used in the prior art are difficult to form a stable interface with the crystalline matrix polymer due to their rapid crystallization rate and the negative volume change exhibited during the heat treatment. Actually, with an increase of the content of thermotropic liquid crystal polymer in the polymer blend, the mechanical properties of the molded articles become lower accordingly. These problems encountered in the prior art using thermotropic liquid crystal polymers have been reported in "*Plastics Molding Techniques,*" Vol. 4, p. 11.

SUMMARY OF THE INVENTION

It is an object of the invention to provide a polymer composition for forming in-situ composite molded articles having improved mechanical properties.

It is another object of the present invention to provide a polymer composition comprising crystalline matrix polymers and thermotropic liquid crystal polymers in which stable interface can be formed between the two polymers and thereby any phase separation dose not occur.

It is still another object of the present invention to provide in-situ composite molded articles having improved mechanical properties.

Other objects and advantages of the present invention will become apparent upon reading the remainder of the specification.

These and other objects of the present invention can be attained by the polymer composition for forming in-situ composite molded articles according to the present invention, which comprises 60 to 80% by weight of a polyphenylene sulfide matrix resin, 5 to 10% by weight of a thermotropic liquid crystal polymer reinforcing agent, and 15 to 30% by weight of a non-crystalline polymer.

DETAILED DESCRIPTION OF THE INVENTION

According to the present invention, the polymer composition for forming in-situ composite molded articles contains 60 to 80% by weight of crystalline polyphenylene sulfide as the matrix resin, based on the total weight of the composition. This type of polyphenylene sulfide can be prepared by the method known in the art and is commercially available. The representative crystalline polyphenylene sulfide udder the trademark RYTON GR-02 ® is available from Phillips Petroleum Chemicals Company.

The thermotropic liquid crystal polymer used in the polymer composition according to the invention can be prepared by methods known in the art. For example, the thermotropic liquid crystal polymer can be prepared by polycondensation of 2,6-dihydroxynaphthoic acid with hydroxybenzoic acid in a proportion by weight of 70:30, preferably 73:27. Alternatively, the thermotropic liquid crystal polymer can be prepared by polycondensation of 2,6-dihydroxynaphthoic acid, terephthalic acid and aminophenol in a proportion by weight of 60:20:20. The thermotropic liquid crystal polymers are present in an amount of 5 to 10% by weight in the polymer composition according to the present invention. If the content of the liquid crystal polymer exceeds 10% by weight, the mechanical properties, such as elongation, tensile strength and tensile modulus, of the resulting molded articles are deteriorated. On the other hand, if the content of the liquid crystal polymer is added in an amount of less than 5% by weight, it is hard to expect synergistic effects in the tensile strength of the resulting molded articles.

In the polymer composition according to the present invention, a non-crystalline polymer selected from the group consisting of polysulfone, polyarylate, polyetherimide and polycarbonate is admixed. The non-crystalline polymer does not cause deterioration of the physical properties which has been usually encountered in the in-situ composite molded articles of the prior art. Although the present invention is not intended to be restricted to certain theory, the non-crystalline polymer, if added, fills the gap between the crystalline polyphenylene sulfide matrix resin and the thermotropic liquid crystal polymer reinforcing agent to serve to enhance the interface adhesiveness between the two crystalline polymers, resulting in the desired results. In addition, existence of the non-crystalline polymer having a higher viscosity relative to the polyphenylene sulfide matrix resin makes the subsequent operations, such as the droplet-like liquid crystal polymer domain deformation, fibrillation and orientation, facile. In the composition of the present invention, the non-crystalline polymer is used in an amount of 15 to 30% by weight.

The polymer composition according to the invention can be molded at a temperature of 285° to 290° C. in the case of melt extrusion and at temperatures of 320° to 350° C. in the case of melt injection.

Hereinafter, the invention will be embodied in greater detail by way of the following examples. However, it should be understood that the examples are presented for illustration purpose only and should not be construed as limiting the invention, which is properly delineated in the claims.

EXAMPLE 1

According to the present invention, a polymer composition for forming in-situ composite molded articles was prepared by blending polyphenylene sulfide (PPS), thermotropic liquid crystal polymer (TLCP) and polysulfone (PSF).

The raw materials used in this example are as follows:
PPS: RYTON GR-02 ® (in the form of pellet) available from Phillips Petroleum Chemicals Company;
TLCP: VECTRA B-950 ® available from Hoechst Celanese, a polycondensate of 60% by weight of 2,6-dihydroxynaphthoic acid, 20% by weight of terephthalic acid and 20% by weight of aminophenol; and
PSF: the Udel P-1700 ® available from Amoco Corporation.

PPS, TLCP and PSF were blended in the proportion listed in Table 1 below, and dried in a forced-convection oven at 100° C for 24 hours. The dry blend was melt extruded in Brabender (a co-rotating twin-screw extruder). The extrudate was quenched in cold water and then pelletized. The temperatures at barrel and die of the Brabender were 295° C. and 300° C., respectively.

Specimen A (composite fiber sample) was prepared from the pellets by using Instron Capillary Rheometer Model 3211. The temperature of the die was 285° to 290° C. and the diameter of the die was 1.245 mm. The ratio of length to diameter of the die was 41 and the apparent shear rate was 100 $S^{-1}$. Spinning draw ratio was calculated according to the following equation:

$$\text{Spinning draw ratio} = \frac{\text{Diameter of capillary}}{\text{Diameter of drawn fiber}}$$

Specimen B (injection molded sample) for the standard tensile test described in ASTM D 638 was prepared from the pellet thus obtained. Injection molding conditions applied in preparing this specimen were as follows:
Temperature of barrel: 350° C.
Temperature of mold: 100° C.
Injection pressure: 7,000 psi
Duration of molding cycle: 1 min.

The specimen B thus obtained was tested and the results are given in Table 1 below.

From Table 1 it is noted that an in-situ composite molded article having significantly improved mechanical properties can be prepared from an incompatible two-component system composed of polyphenylene sulfide and liquid crystal polymers by adding non-crystalline polysulfone polymers as a third component into the system. This unexpected results are due to the fact that the non-crystalline polysulfone polymers once added increase the deformation of spherical droplets within the matrix resin; thereby they enhance the aspect ratio and the interface stability of the droplets.

COMPARATIVE EXAMPLE 1

Specimens A (fiber sample) and B (injection molded sample) were prepared according to the same procedure as in Example 1, except that PSF was not added. The resultant specimens were tested according to the same method as in Example 1. Specimen A (composite fiber) was drawn at a spinning draw ratio of 3. The results are present in Table 1 below.

TABLE 1

| Example No. | Composition (wt. %) (PPS:PSF:TLCP) | Tensile strength (kg/mm²) A | Tensile strength (kg/mm²) B | Tensile modulus (kg/mm²) A | Tensile modulus (kg/mm²) B | Elongation (%) B |
|---|---|---|---|---|---|---|
| C-Ex. 1 | 90:0:10 | 5.90 | 5.75 | 240 | 235 | 2.63 |
| Ex. 1 | 75:15:10 | 6.10 | 5.75 | 270 | 210 | 2.81 |
| Ex. 1 | 60:30:10 | 6.93 | 6.75 | 270 | 198 | 3.35 |

EXAMPLE 2

A series of five specimens were prepared by injection molding according to the same procedure as in Example 1, except that the composition ratios of the constituent ingredients were changed as listed in Table 2 below. The mechanical properties of the specimens were put to a test according to the same method as in Example 1. The results are listed in Table 2 below.

TABLE 2

| Composition (wt. %) (PPS:PSF:TLCP) | Tensile strength (kg/mm$^2$) | Tensile modulus (kg/mm$^2$) | Elongation (%) |
| --- | --- | --- | --- |
| 70:30:0 | 5.65 | 167 | 3.0 |
| 66.5:28.5:5 | 6.85 | 180 | 3.4 |
| 63:27:10 | 6.70 | 198 | 3.5 |
| 52.5:22.5:25 | 3.41 | 185 | 4.1 |
| 35:15:50 | 3.00 | 269 | 4.2 |

EXAMPLE 3

A composite fiber specimen was prepared according to the same procedure as in Example 1, except that VECTRA A-950®, a polycondensate of 73% by weight of 2,6-dihydroxynaphthoic acid and 27% by weight of hydroxybenzoic acid, was used as the thermotropic liquid crystal polymer. The mechanical properties of the specimen thus obtained were tested and the results are given in Table 3 below.

COMPARATIVE EXAMPLE 2

The same procedure as in Example 3 was repeated, except that PSF was not added. The resulting composite fiber was drawn at a spinning draw ratio of 1 3. The mechanical properties of the composite fiber were put to a test and the results are presented in Table 3 below.

TABLE 3

| Example No. | Composition (wt %) (PPS:PSF:TLCP) | Tensile strength (kg/mm$^2$) | Tensile modulus (kg/mm$^2$) | Elongation (%) |
| --- | --- | --- | --- | --- |
| C-Ex. 2 | 90:0:10 | 5.3-5.8 | 200 | 3 |
| Ex. 3 | 75:15:10 | 6.6 | 240 | 4-4.2 |
| Ex. 3 | 60:30:10 | 7 | 235 | 4.1 |

As can be seen from the results obtained in the above examples and comparative examples, in-situ composite molded articles having remarkably improved physical properties can be prepared according to the present invention by incorporating non-crystalline polymers as a third component into the noncompatible two component system consisting of polyphenylene sulfide matrix resins and thermotropic liquid crystal polymers.

What is claimed is:

1. A polymer composition for forming in-situ composite molded articles comprising 60 to 80% by weight of a phenylene sulfide matrix resin, 5 to 10% by weight of a thermotropic liquid crystal polymer selected from the group consisting of a polycondensate of 2,6-dihydroxynaphthoic acid with hydroxybenzoic acid and a polycondensate of 2,6-dihydroxynaphthoic acid acid, terephthalic acid and aminophenol, and 15 to 30% by weight of a non-crystalline polysulfone polymer.

2. The polymer composition of claim 1, wherein the thermotropic liquid crystal polymer is a polycondensate of 2,6-dihydroxynaphthoic acid with hydroxybenzoic acid.

3. The polymer composition of claim 1, wherein the thermotropic liquid crystal polymer is a polycondensate of 2,6-dihydroxynaphthoic acid with hydroxybenzoic acid.

4. The polymer composition of claims 1, 2 and 3, wherein the in-situ composite molded articles are formed by melt injection at a temperature of 320° to 350° C.

5. The polymer composition of any of claims 1, 2 and 3, wherein the in-situ composite molded articles are formed by melt extrusion at a temperature of 285° to 290° C. or by melt injection at a temperature of 320° to 350° C.

* * * * *